United States Patent [19]

Schmidt et al.

[11] Patent Number: 5,734,624
[45] Date of Patent: Mar. 31, 1998

[54] WIDE-BAND OMNI TELEMETRY SYSTEM

[75] Inventors: Robert D. Schmidt, Oakdale; James M. Gannon, Gales Ferry; Foster L. Striffler, New London, all of Conn.

[73] Assignee: The United States of America as represented by the Secretary of the Navy, Washington, D.C.

[21] Appl. No.: 744,702

[22] Filed: Oct. 31, 1996

[51] Int. Cl.$^6$ ................................................. H04B 11/00
[52] U.S. Cl. ................................................. 367/134; 367/106
[58] Field of Search ................................ 367/134, 131, 367/130, 106, 21

[56] References Cited

U.S. PATENT DOCUMENTS

| | | | |
|---|---|---|---|
| 4,187,493 | 2/1980 | Patterson | 367/135 |
| 4,737,968 | 4/1988 | Norton et al. | 375/297 |
| 4,868,795 | 9/1989 | McDavid et al. | 367/77 |
| 5,301,167 | 4/1994 | Proakis et al. | 367/134 |
| 5,450,369 | 9/1995 | Mastin et al. | 367/21 |

*Primary Examiner*—Daniel T. Pihulic
*Attorney, Agent, or Firm*—Michael J. McGowan; Michael F. Oglo; Prithvi C. Lall

[57] ABSTRACT

The present invention comprises a wide-band omni telemetry system adapted for increasing the signal transmission bandwidth of an existing tactical array having a single shared transmission line. In accordance with one embodiment of the invention electronic elements are provided for conditioning and converting a wide-band analog data signal, received from an underwater acoustic sensing device, to an appropriate wide-band digital signal. Timing elements provide a carrier wave signal interface with telemetry elements for modulating the carrier wave signal with the wide-band digital signal wherein the carrier wave is quadrature phase shift key modulated. In this way two separate carrier waves are created that are shifted in phase by about 90° relative to one another. Coupling elements are employed to couple the two carrier waves to the tactical array wherein at least two diplexors interface with the carrier waves so as to couple the wide-band digital signal with a plurality of acoustic and environmental data gathered by the tactical array. The coupled carrier waves are then transmitted over the single shared transmission line. Command decoding elements provide a communication link to the tactical array so as to synchronize generation of the wide-band analog data signal by the underwater acoustic sensing device with the operation of the telemetry elements.

12 Claims, 5 Drawing Sheets

WIDE-BAND OMNI TELEMETRY SYSTEM

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The present invention relates to towed tactical array systems, and more particularly to a single channel wide-band omni (WBO) telemetry system that allows for the transmission of wide-band signals on existing data transmission systems.

(2) Description of the Prior Art

It is well known for naval vessels to employ a towed array of acoustic sensors (e.g., hydrophones or the like) to gather tactical information. Typically, acoustic waves are directed into the sea where they are reflected by any object that encounters the waves. The reflected waves travel back toward the ship where they are detected by underwater acoustic sensors and transmitted to shipboard processing electronics as raw analog data signals. Often a single data bus, such as a coaxial cable, is employed to carry the raw analog data signals from the acoustic sensor array to shipboard recording equipment.

In addition to the acoustic information, it is also necessary to collect and transmit nonacoustic data concerning the underwater environment and status of the electronic equipment in the array, e.g., temperature, pressure, salinity, turbulence, power supply voltage, and command codes, etc. This situation creates the need to transmit a very large quantity of information over a single transmission line. It will be appreciated that a relatively wide band-width signal will increase the amount of data that may be transmitted over a single transmission line, such as a coaxial cable. It will also be appreciated that many schemes and systems have been introduced for transmitting acoustic sensor array data to shipboard receivers. Examples of such systems and techniques are variously disclosed in U.S. Pat. Nos. 4,187,493; 4,737,968; 4,868,795; 5,301,167; and 5,450,369, which patents are hereby incorporated herein by reference.

Unfortunately, existing tactical array systems, such as the TB-23 array, often do not have the electronic capability to transmit wide-band signals over a shared coaxial cable to a shipboard receiver. As a result, transmission of data in prior art towed arrays has been limited in bandwidth. In particular, there are very few known methods of transmitting wide-band data that permit transmission of any signals from the aft end of a TB-23 array to a shipboard receiver without major modifications to the tactical systems involved.

Figure 1:
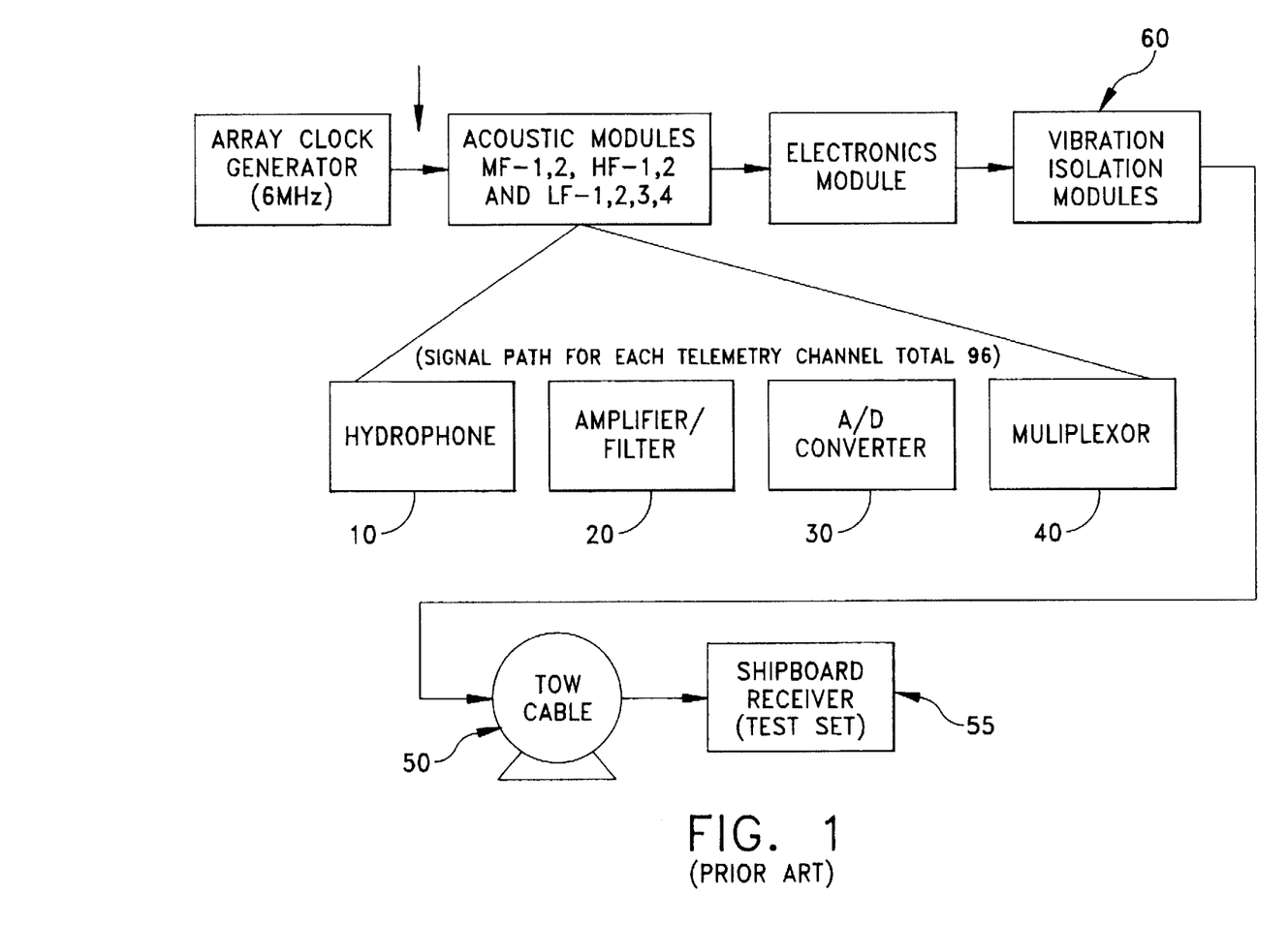
FIG. 1 is a schematic representation of a prior art TB-23 Towed Array Telemetry System.

For example, a block diagram of a prior art (TB-23) towed array telemetry system is shown in FIG. 1. Typically, acoustic signals from a hydrophone 10 are received by the array system. Prior art electronic circuitry of the type used in connection with towed arrays typically only transmits low frequency information (narrow band signals). An amplifier/filter 20 extracts and amplifies the low frequency signals, an A/D converter 30 converts the signal from analog to 12 bit parallel digital data, and a multiplexor 40 reformats the low frequency 12 bit parallel digital data into a serial digital format. This signal is then transmitted over a single shared coax cable, through a tow cable 50, and to a shipboard receiver 55. Typically, eight acoustic modules 12 receive tactical information while the electronics module 14 receives and transmits environmental information from the towed array (i.e., depth, pressure, and system temperature data). The information from both of these modules is also transmitted to shipboard receiver 55 over the same shared coax cable and through the tow cable 50. Vibration isolation module 60 isolates all mechanically transmitted data (e.g., from the ship) in order to filter out the signals that would interfere with tactical array information.

As a consequence, there has been a long felt need for a wide-band omni telemetry system that brings wide-band capabilities to existing tactical array systems, such as the TB-23 and like arrays.

SUMMARY OF THE INVENTION

It is, therefore, an object of the invention to provide a wide-band omni telemetry system with all the aforementioned needs substantially met.

Another object of the present invention is to provide a wide-band omni telemetry system that brings wide-band capabilities to existing tactical array systems, such as the TB-23 and like arrays.

Another object of the present invention is to provide a wide-band omni telemetry system having the capability of an unlimited frequency coverage at a low cost.

Still another object of the present invention is to provide a wide-band omni telemetry system that does not involve a major upgrade or redesign of existing array systems.

Another object of the present invention is to provide a wide-band omni telemetry system that is an add-on system, thereby having the least impact on the tactical array.

A further object of the present invention is to provide a wide-band omni telemetry system that employs a Quadrature Phase Shift Key modulator for the transmission of wide-band signals on the existing data transmission lines of a tactical array system.

A still further object of the present invention is to provide a wide-band omni telemetry system that employs a Quadrature Phase Shift Key modulator to modulate a carrier signal with a digital data stream prior to transmission.

A further object of the present invention is to provide a wide-band omni telemetry system that employs a Quadrature Phase Shift Key modulator that allows the modulated carrier signal to be placed in a unique frequency band which can be later separated out by employing band-pass filtering.

Another object of the present invention is to provide a wide-band omni telemetry system that employs a plurality of diplexors to couple wide-band data to a tactical array system.

Another object of the present invention is to provide a wide-band omni telemetry system wherein at least one diplexor couples wide-band data with acoustic and environmental data for transmission on a shared data transmission line.

With the above and other objects in view, as will hereinafter appear, a feature of the present invention is the provision of a wide-band omni telemetry system for increasing the signal transmission bandwidth of an existing tactical array, having a single shared transmission line, the system comprising means for conditioning and converting a wide-band analog data signal received from an underwater acoustic sensing device to an appropriate wide-band digital signal, and timing means for providing a carrier wave and a signal interface, and telemetry means for modulating the carrier wave signal with the wide-band digital signal, wherein the carrier wave is quadrature phase shift key modulated. In this way two separate carrier waves are created that are shifted in phase by about 90° relative to one another. Means for coupling the two carrier waves to the tactical array are provided wherein at least two diplexors interface with the carrier waves so as to couple the wide-band digital signal with a plurality of acoustic and environmental data gathered by the tactical array. The coupled carrier waves are then transmitted over the single shared transmission line. Command decoding means provide a communication link to the tactical array so as to synchronize generation of the wide-band analog data signal by the underwater acoustic sensing device with the operation of the telemetry means.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 2:
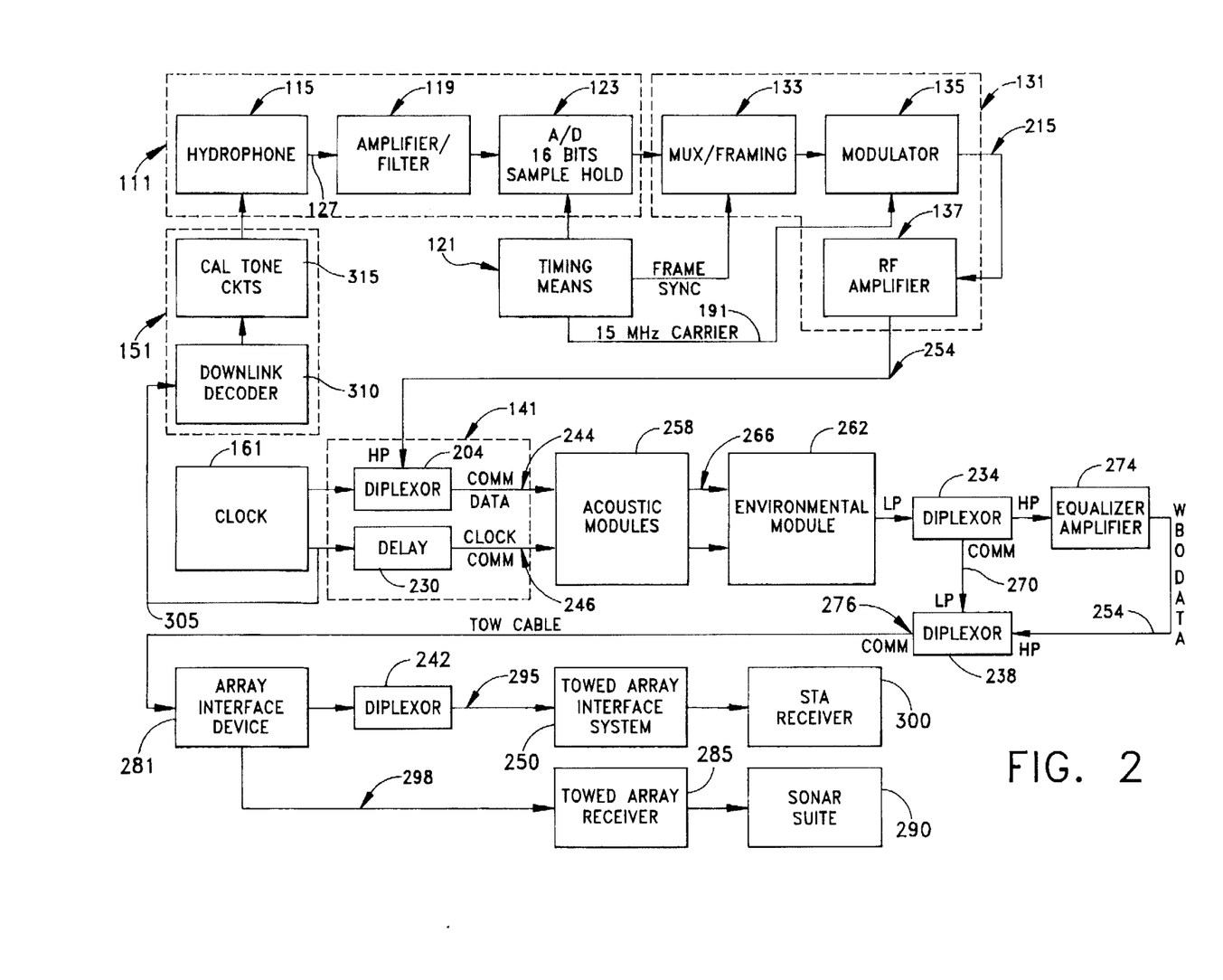
FIG. 2 is a block diagram showing the telemetry system of the present invention.

Referring to FIG. 2, it will be seen that the wide-band telemetry system of the present invention preferably comprises signal conditioning/conversion means 111, timing means 121, telemetry means 131, coupling means 141, command decoding means 151, and a clock 161.

More particularly, signal conditioning and conversion means 111 preferably comprise a hydrophone 115, an amplifier/filter 119 and an analog to digital (A/D) converter 123. Signal conditioning and conversion means 111 are adapted to filter and digitize an analog data signal. In particular, a raw analog signal 127, such as is produced by hydrophone 115, is passed to amplifier/filter 119 where it is filtered to prevent ailaising and to extract a wide-band signal. This wide-band signal is then passed to A/D converter 123. A/D converter 123 samples and holds the wide-band signal while it is being converted from an analog to a digital signal. Timing means 121 synchronize the signal transfers into A/D converter 123. The output of A/D converter 123 is preferably a 16 bit parallel digital data signal. Amplifier/filter 119 and A/D converter 123 filter and digitize raw analog data signal 127 using electronic circuitry of the type that is well known in the art for this purpose. Significantly, prior art towed arrays have typically only utilized filters capable of extracting low frequency signals.

In a preferred embodiment of the present invention, telemetry means 131 comprise a multiplexor/framer 133, a modulator 135 and a radio frequency (RF) amplifier 137. Telemetry means 131 are adapted to convert the 16 bit parallel digital data from signal conditioning and conversion means 111 to a serial digital data format that is suitable for transmission over long lengths of coaxial cable. The data format used in connection with the present invention is typically referred to as Quadrature Phase Shift Keyed (QPSK) modulation, as will hereinafter be disclosed in further detail.

Figure 3:
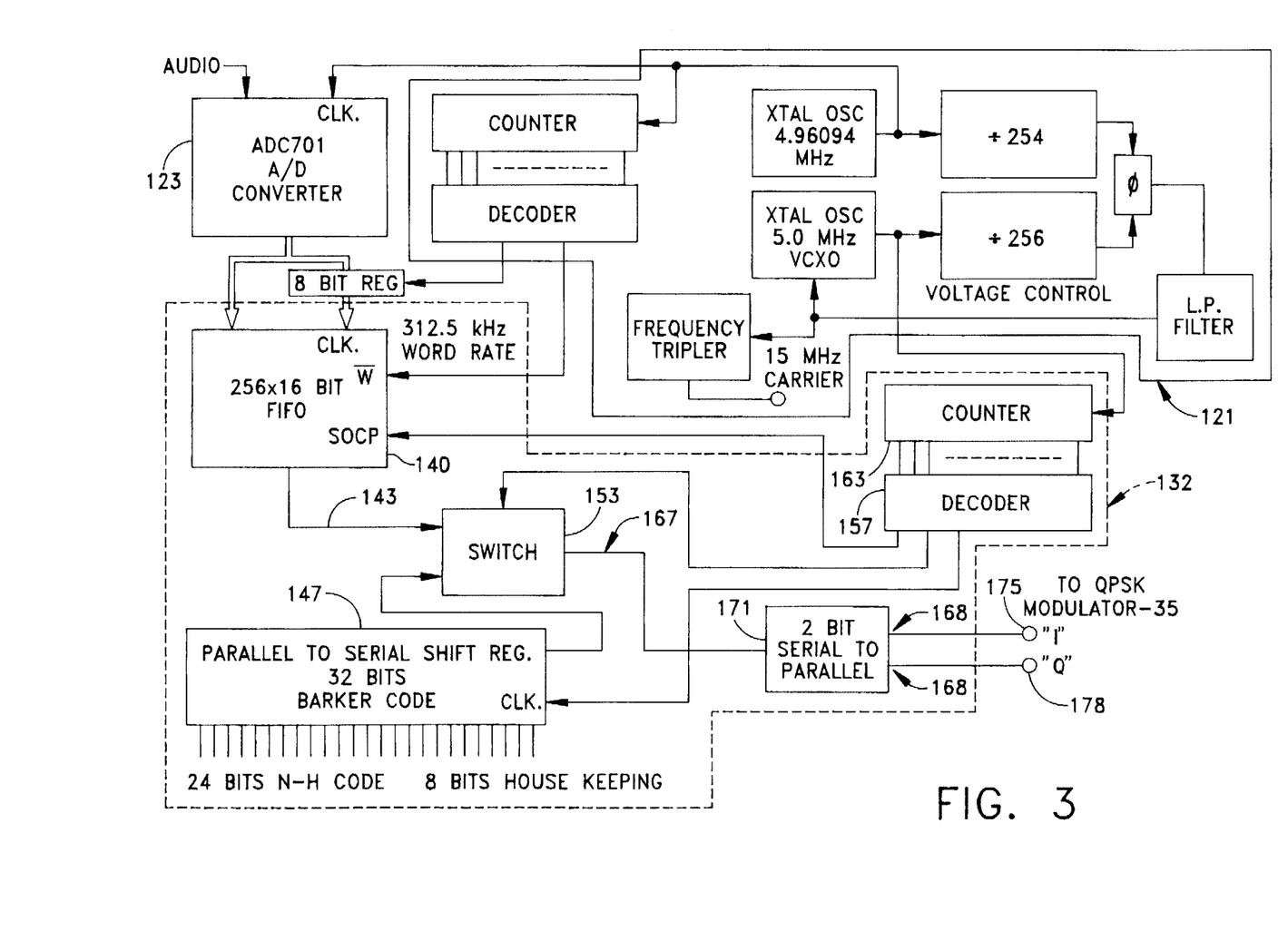
FIG. 3 is a block diagram showing details of the timing and data formatter of the present invention.

FIG. 3 shows a functional block diagram of one preferred circuitry design for multiplexor/framer 133 comprising multiplier means 132 and timing means 121. More particularly, multiplexor/framer 133 receives the sixteen (16) bit parallel digital data from A/D converter 123, and loads that data into a 256×16 bit FIFO 140. FIFO 140 converts the parallel digital data to a one (1) bit serial digital data format. Timing means 121 synchronize the data transfer from A/D converter 123 to FIFO 140. Output data 143 of FIFO 140, along with the output from a parallel to serial shift register (Barker Code) 147, are then simultaneously presented to a switch 153 for reformatting of FIFO output data 143 to a 2 bit serial digital format. Timing means 121 also synchronize the transfer of data to switch 153.

A decoder 157 and counter 163 interface with both switch 153 and parallel to serial shift register (Barker Code) 147. Once decoder 157 recognizes that counter 163 has reached the end of a FIFO word (represented by output data 143 of FIFO 140) that data will then be presented to switch 153 so that switch 153 will always be available for FIFO output data 143, i.e., the next FIFO word. Once FIFO output data 143 is presented to switch 153, decoder 157 turns switch 153 on, and the first 32 bits of Barker Code 147 are multiplexed with FIFO output data 143, thereby providing a frame recognition for FIFO output data 143. Switch 153 provides a signal 167 which is, in turn, fed into a converter 171 which converts signal 167 to a two (2) bit serial digital data stream 168.

Figure 4:
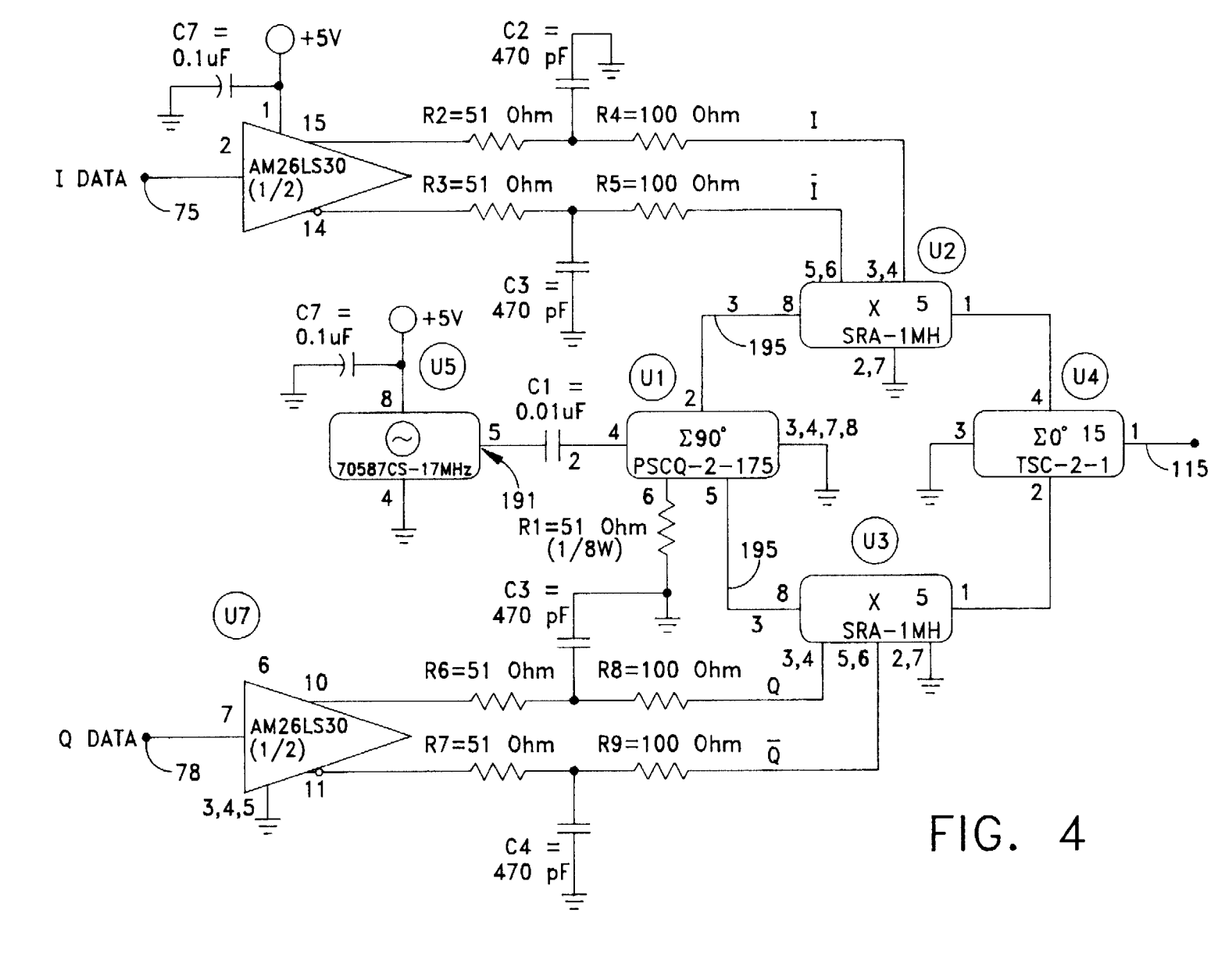
FIG. 4 is a detailed schematic diagram of one preferred QPSK modulator circuit adapted for use with the present invention.

The two bit serial digital data stream 168 output by converter 171 (indicated at 175 and 178 in FIG. 3) is typically referred to as "I" and "Q" channel data respectively. I channel data 175 and Q channel data 178 are directed into modulator 135 (FIGS. 2 and 4). In the present invention, modulator 135 employs QPSK to modulate a carrier signal with digital data stream 168 from converter 171 prior to transmission. A schematic diagram of one preferred circuitry design for a QPSK modulator is shown in FIG. 4. This arrangement allows a modulated carrier signal to be placed in a unique frequency band which can be later separated out by employing band-pass filtering of a type that is well known in the art.

More particularly, in a QPSK modulator the transmitted phase may be any one of four "quaternary phase states", i.e., 0°, 90°, 180° or 270°, with each such quaternary phase state representing one of four possible combinations of two binary bits, e.g., 00,01,10,11. It has been discovered that this format is particularly well suited for transmission on coaxial cable when serial digital data will be in the presence of other data, e.g., acoustic and environmental data from a conventional towed tactical array. In the present invention, the carrier frequency is preferably about 15 MHz, and the telemetry bandwidth is preferably about 4.8 MHz. As shown in FIG. 2, the 15 MHz carrier signal 191 is preferably generated by timing means 121. Carrier signal 191 is split into two signal carriers 195 which are driven 90° out of phase with respect to one another by QPSK modulator 135 (FIG. 4). Carrier signals 195 are then digitally modulated by serial digital data stream 168 (FIG. 3) that is received from multiplexor 133 (FIG. 2), yielding a digitally modulated RF carrier signal 215 (FIG. 2). In this form, the modulated serial data is capable of being transmitted over a shared coaxial transmission path with, e.g., acoustic and environmental data. This approach has been found to be particularly advantageous in naval towed array applications since very often there is not enough space within existing towed array data streams for wide-band data in its typical form.

Figure 5:
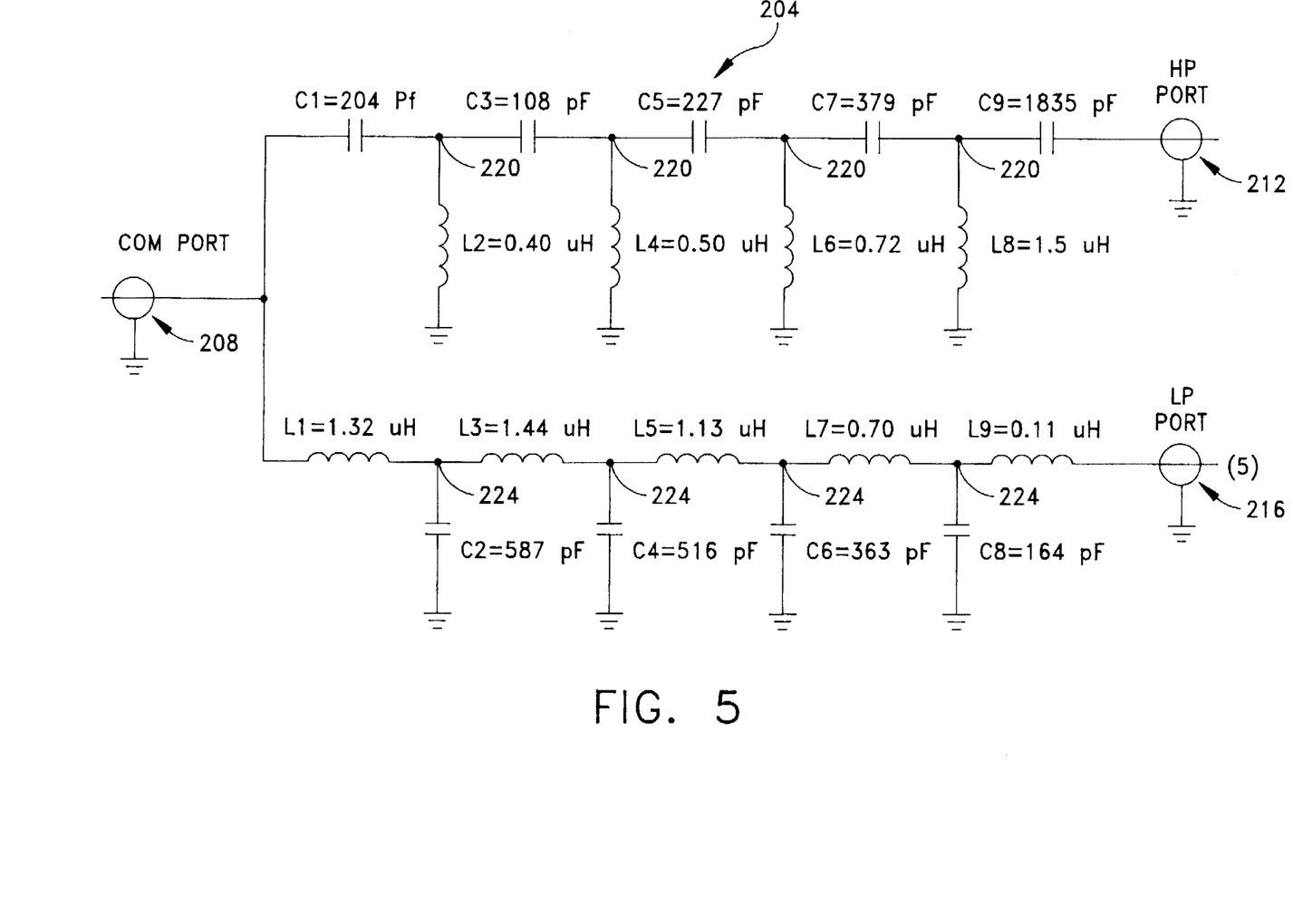
FIG. 5 is a schematic diagram of a diplexor (9th order Butterworth) that is used in connection with the present invention.

Referring to FIG. 2, RF carrier signal 215 is passed to RF amplifier 137 and then transmitted to a diplexor 204 of coupling means 141. More particularly, coupling means 141 are adapted to couple wide-band data to the tactical array. Coupling means 141 preferably comprise two separate three port diplexors 204 and 230, that are tuned to combine and/or reject predetermined bands of signal frequencies. A schematic for diplexors of the type used in connection with the present invention is shown in FIG. 5. Each diplexor comprises a common port 208, a high pass port 212, and a low pass port 216. More particularly, common port 208 is adapted to receive the full band of information carried by RF carrier signal 215 (FIG. 2). High pass port 212 (FIG. 5) is adapted to receive the high band information, and low pass port 216 is adapted to receive the low band information from RF carrier signal 215, respectively. Each diplexor also comprises a plurality of high pass filters 220 and low pass filters 224. In a preferred embodiment, high pass filters 220 and low pass filters 224 use a well known 9-pole Butterworth filter design with about a 0.5 dB ripple in the pass band.

Referring again to FIG. 2, there are preferably five diplexors (204, 230, 234, 238 and 242) used in connection with the present invention. For example, two diplexors are located at the aft end of a typical tactical array, i.e., data diplexor 204 on data coax 244 and clock diplexor 230 on clock coax 246. Data diplexor 204 is the interface with the tactical system and clock diplexor 230 is used for timing. Diplexors 234 and 238 are located at the forward end of the tactical system, and are used to separate the wide-band and tactical array data so that the wide-band data can be amplified and then recombined with the tactical data. Diplexor 242 interfaces with a Towed Array Interface System (TAIS) 250 so as to separate the wide-band data from the tactical data. Preferably, each diplexor 204, 230, 234, 238 and 242 is installed as an in-line device.

More specifically, modulated signal carrier 215, after being amplified by RF amplifier 137, is passed into data diplexor 204 as a wide-band amplified signal 254. Data diplexor 204 couples the wide-band signal 254 with acoustic data module 258 and environmental data module 262 on a shared coax cable 266. Thus, in accordance with one preferred embodiment of the present invention, acoustic data module 258 places tactical array data on coax cable 266 while data diplexor 204 simultaneously places wide-band data 254 on that same data coax cable 266. Both types of data are then passed to environmental data module 262 whereby module 262 inputs, e.g., temperature and depth pressure data, on shared coax 266. As a result of this arrangement, data diplexor 204 enables an existing towed array to share one data coax cable 266, which is fully compatible with current towed array system designs.

In addition, clock 161 provides about a fifty (50) ohm termination for data coax cable 266, thereby preventing reflections, and ensuring that only clear signals are transmitted. Clock 161 also provides timing for the tactical array. It will be appreciated that clock diplexor 230 duplicates the delay which occurs in data diplexor 204, thus ensuring that proper synchronization occurs.

Still referring to FIG. 2, the data from data diplexor 204, acoustic data module 258 and environmental data module 262 is then passed to separation diplexor 234, located at the forward end of the tactical system, in order to further amplify wide-band data 254. Diplexor 234 separates wide-band data 254 from tactical data 270. Wide-band data 254 is then amplified by equalizer (amplifier) 274 and subsequently recombined with the tactical data 270 via data diplexor 238. Combined data 276 is then typically transmitted over a tow cable 278 to an Array Interface Device (AID) 281.

AID 281 passes combined data 276 onto a towed array receiver 285 for transmittal to a sonar suite 290, and to diplexor 242 located between AID 281 and TAIS 250. Diplexor 242 separates wide-band data 295 from tactical array data 298 prior to receipt of the data by TAIS 250. TAIS 250 then transmits wide-band data 295 to an analysis and recording system receiver 300. Analysis and recording system receiver 300 records wide-band data 295, converts wide-band data 295 back to TTL logic (reformat data from serial to parallel), and enables wide-band data 295 to be analyzed and tested.

The data that is transmitted to towed array receiver 285 includes both wide-band signals and tactical array data signals. However, towed array receiver 285 only requires data signals from acoustic data module 258 and environmental data module 262. It will be understood that a diplexor is not needed to separate the wide-band signals from this other data since towed array receiver 285 typically incorporates a filter that eliminates all the signals that are not generated from acoustic data modules 258 and environmental data module 262.

Referring again to FIG. 2, command decoding means 151 provides the system of the present invention with a communication link to the tactical array. More particularly, command decoding means 151 comprises a clock line 305, a decoder 310, and a calibration tone circuit 315. Decoder 310 comprises logic circuitry of a type well known in the art for decoding down-link commands. Command decoding means 151 provides a control function to the wide-band omni system of the present invention, as well as providing a calibration tone capability.

Still referring to FIG. 2, environmental data module 262 is adapted to detect all of the down link commands from the tactical array, and to place such information onto clock line 305. Typically, one of the down-link commands is actually a command to either turn calibration tone circuit 315 on or off. More particularly, decoder 310 is programmed to only recognize those down link commands received via clock line 305 that consist of calibration tone commands. If, for example, a down-link command is a command to turn on calibration tone circuit 315, decoder 310 switches calibration tone circuit 315 on, whereby calibration tone circuit 315 sends an amplified tone to hydrophone 115. On the other hand, if a down-link command is a command to turn off calibration tone circuit 315, decoder 310 switches calibration tone circuit 315 off, whereby calibration tone circuit 315 stops sending an amplified tone to hydrophone 115.

The circuitry used in connection with the present invention is preferably implemented using a combination of integrated circuits, wide-band transistors and radio frequency function modules. The function of each circuit, transistor or module is fully described by literature supplied by the manufacturers of these components, and the manner in which the circuitry operates would be obvious to one skilled in the art of electronics.

The present invention brings wide-band capabilities to towed tactical arrays, such as the TB-23. The present invention also provides the capability of an unlimited frequency coverage at a low cost to the U.S. Navy since it does not involve a major upgrade or redesign of the existing array system. Furthermore, the present invention has a very low impact on an existing tactical array since it is an add-on system.

Also, telemetry means 131 utilizes QPSK modulator 135 for the transmission of wide-band signals on the existing data transmission lines. Thus, the QPSK modulator 135 is used to modulate a carrier signal with the digital data stream prior to transmission. This allows the modulated carrier signal to be placed in a unique frequency band which can be later separated out by employing band-pass filtering.

Moreover, diplexors are utilized to couple wide-band data to the tactical array. Specifically, diplexor 204 initially couples the wide-band data with the acoustic and environmental data on shared data transmission line 266. Diplexors 234 and 238 separate the wide-band data from the acoustic/environmental data for amplification, and then recombine the wide-band data with the tactical array data. Diplexor 242 then separates the wide-band data from the tactical array data in order to permit the wide-band signal to be analyzed and tested. Finally, diplexor 230 is used in conjunction with clock 161 to duplicate the delay which occurs in the data diplexor 204, thereby ensuring proper synchronization.

It is also to be understood that the present invention is by no means limited to the particular constructions herein disclosed and shown in the drawings, but also comprises any modifications or equivalents within the scope of the claims.

What is claimed is:

1. Apparatus for increasing the signal transmission bandwidth of a tactical array system having a single shared transmission line, said apparatus comprising:

means for conditioning and converting a wide-band analog data signal received from an underwater acoustic sensing device to an appropriate wide-band digital signal;

timing means for providing a carrier wave signal;

telemetry means for modulating said carrier wave signal with said wide-band digital signal wherein said carrier wave is quadrature phase shift key modulated by modulator means so as to create two separate carrier waves that are shifted in phase by about 90° relative to one another;

means for coupling said two carrier waves to said tactical array wherein at least two diplexors interface with said two carrier waves so as to couple said wide-band digital signal with a plurality of acoustic and environmental data gathered by said tactical array for transmission on said single shared transmission line; and command decoding means for providing a communication link to said tactical array so as to synchronize generation of said wide-band analog data signal by said underwater acoustic sensing device with the operation of said telemetry means.

2. Apparatus according to claim 1 wherein said diplexors comprise two separate three port diplexors that are tuned to combine and reject predetermined bands of signal frequencies.

3. Apparatus according to claim 2 wherein said diplexors comprise 9-pole butterworth filters having about a 0.5 ripple in the band pass of said filter.

4. Apparatus according to claim 1 wherein said carrier wave signal comprises a frequency of about 15 megahertz.

5. Apparatus according to claim 4 wherein said telemetry means comprises a bandwidth of about 4.8 megahertz.

6. Apparatus according to claim 1 wherein a first pair of said diplexors are located at an aft end of said tactical array and are adapted to couple said wide-band data signal with said plurality of acoustic and environmental data and to time said data coupling;

a second pair of said diplexors are disposed at a forward end of said tactical array so as to separate said wide-band and said plurality of acoustic and environmental data so that said wide-band data may be amplified prior to being recombined to said plurality of acoustic and environmental data; and a single diplexor interfaced with a towed array interface system so as to separate said wide-band data from said plurality of acoustic and environmental data.

7. Apparatus according to claim 1 wherein said coupling means includes:

means for amplifying a modulated carrier signal to form a wide-band signal and transmitting said wide-band signal;

a first of said two diplexors being adapted to couple said wide-band signal with said acoustic data from an acoustic data module and said environmental data from an environmental data module on said single shared transmission line; and a second of said two diplexors being adapted to duplicate delays caused by said first diplexor during coupling of said wide-band signal with said acoustic data and said environmental data.

8. Apparatus according to claim 1 wherein said means for conditioning and converting a wide-band analog data signal comprise an amplifier/filter adapted to extract high frequency signals from a raw analog signal that is generated by said underwater acoustic sensing device.

9. Apparatus according to claim 1 wherein said telemetry means comprise multiplexor/framer means comprising:

means responsive to said means for conditioning and converting a wide-band analog data signal, for receiving parallel digital data from said means for conditioning and converting and converting said parallel digital data to a one bit serial digital data format, wherein said timing means synchronizes transfer of said parallel digital data from said conditioning and converting means to said multiplexor/framer means;

a switch operatively coupled to said multiplexor/framer means, said switch being adapted to reformat said one bit serial digital data to a two bit serial digital data format;

means responsive to said switch and to said means for receiving said parallel digital data for multiplexing said two bit serial digital data as I and Q channel data to be presented to said quadrature phase shift key modulator means; and amplifier means adapted to amplify said two carrier waves.

10. Apparatus according to claim 9 wherein said means for receiving a plurality of parallel digital data comprise a 256×16 bit FIFO and parallel to serial shift register means.

11. Apparatus according to claim 1 wherein said command decoding means comprise;

a clock line disposed in electrical communication with an environmental module for receiving a plurality of down link commands detected by said environmental module;

decoder means disposed in cooperative relation to said clock line and responsive to said plurality of down link commands; and calibration tone circuit means disposed in cooperative relation with said decoder means so as to be activated by said decoder means in response to a predetermined one of said plurality of down link commands whereby said calibration tone circuit means are activated so as to create an amplified tone and to transmit said tone to said underwater acoustic sensing device.

12. Apparatus for increasing the signal transmission bandwidth of a tactical array system having a single shared transmission line, said apparatus comprising:

means for conditioning and converting a wide-band analog data signal received from an underwater acoustic sensing device, to an appropriate wide-band digital signal;

timing means for providing a carrier wave signal;

telemetry means for modulating said carrier wave signal with said wide-band digital signal wherein said carrier wave signal is quadrature phase shift key modulated by modulator means to create two separate carrier waves that are shifted in phase by about 90° relative to one another, said telemetry means including multiplexor/framer means comprising means responsive to said means for conditioning and converting a wide-band analog data signal for receiving parallel digital data from said means for conditioning and converting and thereby converting said parallel digital data to a one bit serial digital data format wherein said timing means synchronize transfer of said parallel digital data from said conditioning and converting means to said multiplexor/framer means, a switch operatively coupled to said multiplexor/framer means, said switch being adapted to reformat said one bit serial digital data to a two bit serial digital data format, means responsive to said switch and said means for receiving and converting parallel digital data to a one bit serial digital data format for multiplexing said two bit serial digital data as I and Q channel data to be presented to said quadrature phase shift key modulator, and amplifier means adapted to amplify said two carrier waves;

means for coupling said two carrier waves to said tactical array wherein a plurality of diplexors interface with said two carrier waves so as to couple said wide-band digital signal with a plurality of acoustic and environmental data gathered by said tactical array for transmission on said single shared transmission line, said pluraltiy of diplexors including a first pair of diplexors located at an aft end of said tactical array and adapted to couple said wide-band data signal with said acoustic and environmental data and to time said data coupling;

a second pair of diplexors disposed at a forward end of said tactical array to separate said wide-band and said acoustic and environmental data so that said wide-band data may be amplified prior to being recombined to said acoustic and environmental data; and a single diplexor interfaced with a towed array interface system to separate said wide-band data from said acoustic and environmental data; and command decoding means for providing a communication link to said tactical array to synchronize generation of said wide-band analog data signal by said underwater acoustic sensing device with the operation of said telemetry means.

* * * * *